March 9, 1971 — M. L. BRAUN ET AL — 3,568,317
DENTAL INSTRUMENT CENTER
Filed Feb. 23, 1968 — 2 Sheets-Sheet 1
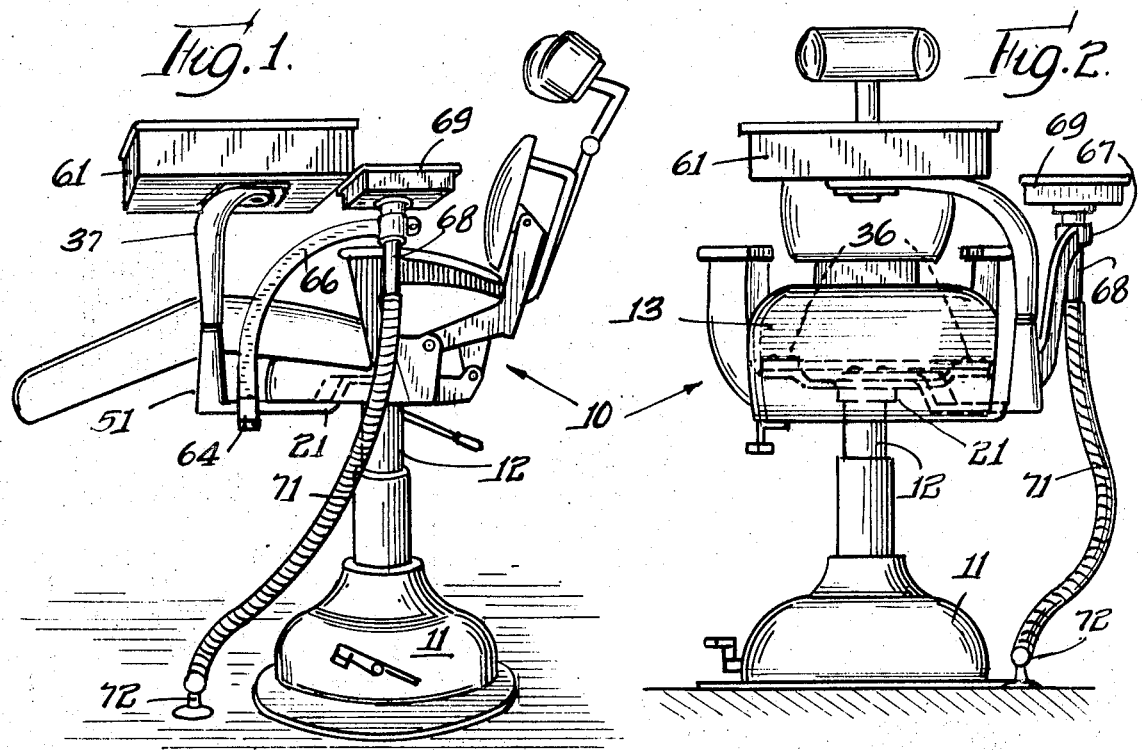
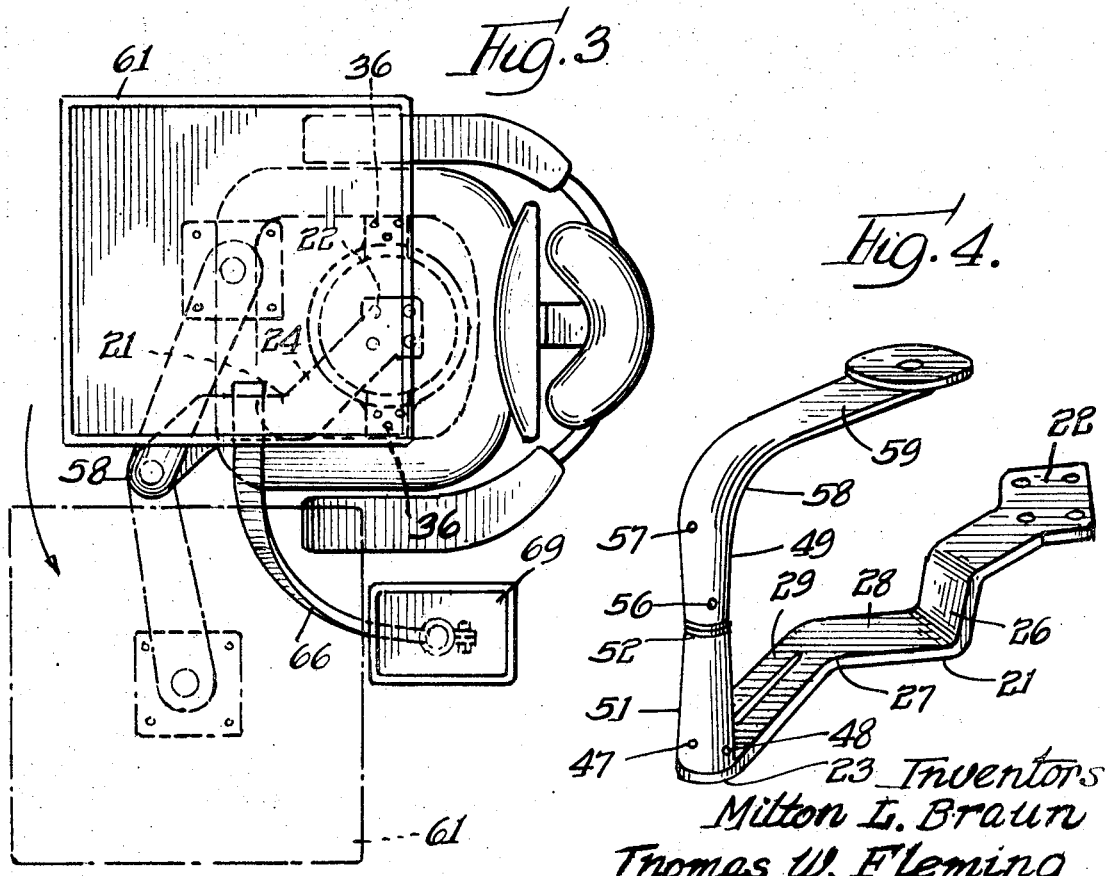
Inventors
Milton L. Braun
Thomas W. Fleming
By: Wallenstein, Spangenburg, Hattis & Strampel attys

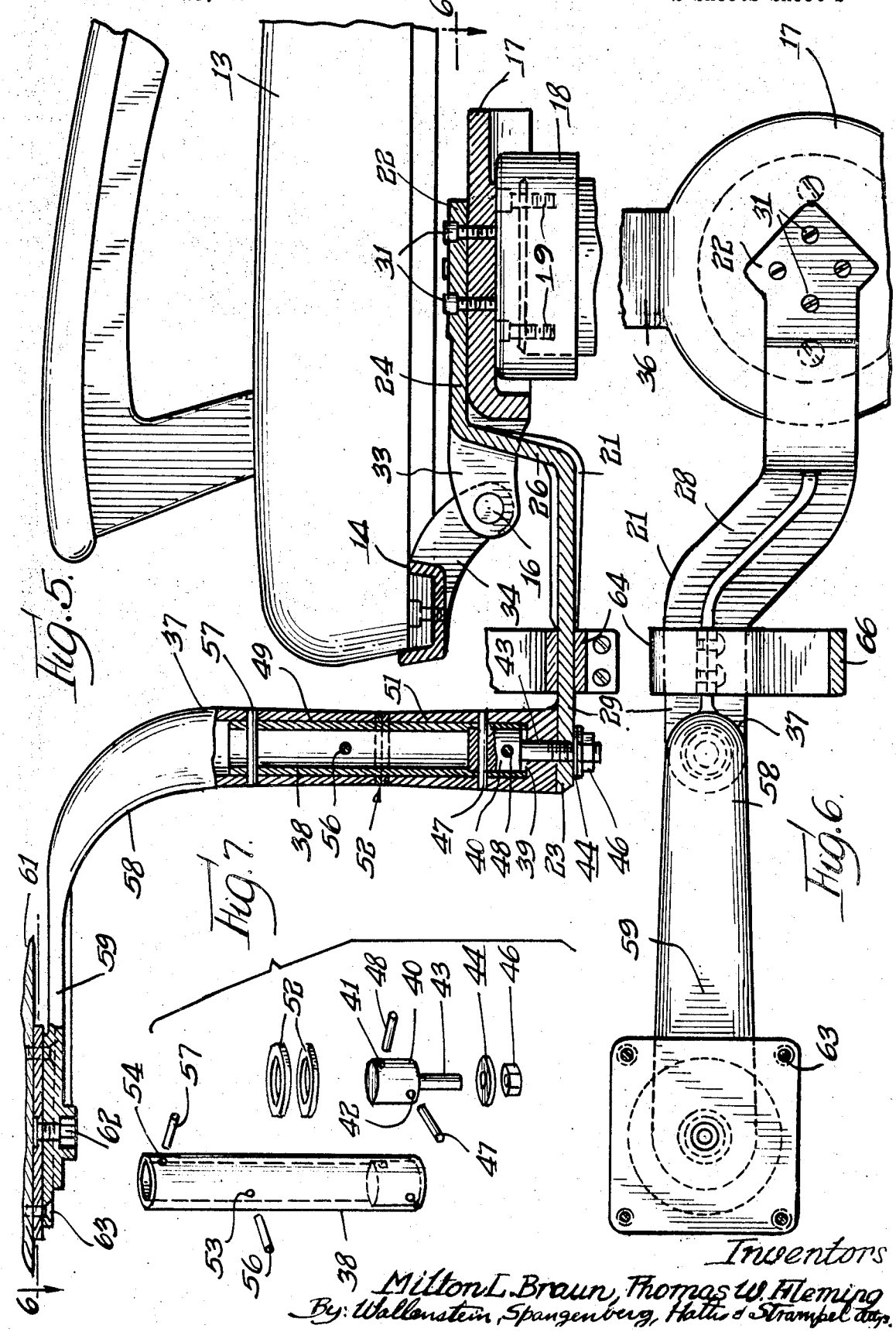

United States Patent Office 3,568,317
Patented Mar. 9, 1971

3,568,317
DENTAL INSTRUMENT CENTER
Milton L. Braun, Flossmoor, and Thomas W. Fleming, Glenwood, Ill., assignors to Auning Corporation, Olympia Fields, Ill.
Filed Feb. 23, 1968, Ser. No. 707,579
Int. Cl. A61c 19/02
U.S. Cl. 32—22
3 Claims

ABSTRACT OF THE DISCLOSURE

A dental instrument center which is constructed and arranged, in combination with a dental chair, to move upwardly and downwardly together with the upward and downward movement of the dental chair, as well as horizontally in an infinite number of positions, the operative mechanism being mounted below the seat of said dental chair.

BACKGROUND OF THE INVENTION

(1) Field of the invention

The present invention is directed to improvements in so-called instrument centers, particularly dental instrument centers in which there is provided, in association with a dental chair subject to movement vertically and otherwise, a dental instrument holder or tray for easy access to the instruments by the dentist or other operator.

(2) Description of the prior art

Dental instrument centers of various types have heretofore been marketed commercially. One of such types of instrument centers represents a unit which is completely separate from the dental chair, is floor mounted, and the instrument support member is capable of adjustment to a variety of positions. Another type is mounted for support, through bracket means, on the base of the dental chair and does not move up and down together with the dental chair. Still another type is connected with the chair so as to move up and down therewith and, in addition, may be pivoted up and down manually. Such units, while serving a most useful purpose, are, in general, characterized by one or more disadvantages such as relatively high cost, occupying an undue amount of floor space, lack of versatility, and complications of construction.

SUMMARY OF THE INVENTION

The improved dental instrument center of our present invention is characterized by a number of advantages over one or more of the heretofore known centers. While possessing desired versatility, it occupies little space, moves up and down together with the vertical movement of the dental chair, may be moved horizontally to an infinite number of positions, is simple in construction and, therefore, economical to manufacture, and the operative mechanism is mounted underneath the seat of the dental chair.

BRIEF DESCRIPTION OF THE DRAWINGS

FIG. 1 is a side perspective view of a dental chair embodying the instrument center of our invention.

FIG. 2 is a front view.

FIG. 3 is a top plan view, with parts broken away, showing the relationship of various of the operating parts.

FIG. 4 is a perspective view showing the bracket arm and plate one end of which arm is designed to be positioned beneath the seat of the dental chair, and the other end of which arm serves to provide the means for ultimate support of the instrument holding unit.

FIG. 5 is a partial vertical section showing the manner of mounting the bracket arm in association with the seat supporting frame, and the construction of the supporting means for the instrument holding unit.

FIG. 6 is a plan view taken along the line 6—6 of FIG. 5.

FIG. 7 is an exploded perspective view showing details of the parts used in the construction of the arm support for the instrument tray or holding unit.

DESCRIPTION OF THE PREFERRED EMBODIMENT

As shown more particularly in FIGS. 1 and 2, there is shown a conventional dental chair 10 having a base member 11 in which is mounted a vertical support or elevator member 12 adapted to be moved upwardly or downwardly by hydraulic or other conventional means, not shown, to raise or lower the dental chair, as the case may be. The dental chair is provided with a conventional seat 13 which is supported on a frame 14 which may be constructed, in accordance with known practice, with a seat pivot 16 and a pivot supporting bracket 17 so as to enable the seat to be moved to tilted or partially reclining position as may be desired.

Overlying the member 12 is an elevator cap 18 which is removably attached to the top of the member 12 by any suitable means as, for instance, threaded bolts 19—19.

The means for supporting the dental instrument center proper comprises an elongated bracket 21. This bracket has, at one end, a horizontal generally planar portion 22 and, at the other end, in a plane below that of the portion 22, is a generally flat surface 23. Intermediate the ends of the bracket 21, there is a horizontal generally planar surface 24 which extends a short distance inward of and in substantially the same plane as the end portion 22. Extending downwardly is an angular portion 26 which merges into a horizontal planar portion 27 which latter comprises arms 28 and 29 in angular relation to each other.

The bracket 21 is rigidly held in position beneath the seat and mounted to ride upwardly and downwardly with the elevator member 12 in any suitable manner. As shown more particularly in FIGS. 3, 5 and 6, this is desirably done through the medium of a plurality of threaded bolts 31 which pass through threaded apertures in the supporting bracket 17 which overlies the elevator cap 18. The bracket 17 is provided with extending parallel arms 33 which encompass parallel arms 34, each set of said parallel arms 33 and 34 having apertures adjacent their ends which, when alined, enable a pin to pass therethrough to form the aforementioned seat pivot 16. At opposite side portions of the bracket 17 there are bracket portions 36 which are suitably fastened to the seat frame.

The flat surfaced end 23 of the bracket 21 has means carried thereon which supports the dental instrument tray or holder. The said means comprises an upwardly extending hollow arm 37, described further below, within which a sleeve 38 is supported. The bottom of the sleeve 38 rests against an inner shoulder 39 in the arm 37. Disposed within the lower part of the sleeve 38 is a plug 40 having vertically spaced apertures 41 and 42 and having a downwardly extending threaded posts 43 which extends through an aperture in the end 23 of the bracket 21. A thrust washer 44 is mounted on the post 43 and a threaded nut 46, when tightened against the thrust washer 44, serves to provide for firmly but removably hold together the arm 37 and sleeve 38 assembly. Pins 47 and 48 pass through the apertures 41 and 42, respectively, and through alined apertures in the wall of the arm 37 to position the plug 40 against rotation and to enable ready assembly and disassembly of the parts. The arm 37, which is made up of an upper section 49 and a lower section 51, which diverge slightly in opposite directions in regard to their cross-sections, is provided with a pair of thrust washers 52, which are desirably made of nylon, between the upper and the lower sections thereof. The wall of the upper section 49 is provided with vertically displaced alined apertures 53 and 54 through which pins 56 and 57, respectively, pass for the purposes described above in regard to the pins 47 and 48 and their cooperating apertures.

The arm 37 at its upper end curves as shown at 58 and then extends outwardly to form a horizontal portion 59 upon which the dental instrument tray, table or holder 61 is mounted and supported as by any convenient means, as, for instance, through threaded bolts 62, 63. The tray or holder may comprise a cabinet member having drawers therein for holding various dental or medical instruments or supplies or the like, and it may also comprise a center to which are connected sources of air, vacuum, water, rinse solutions, saliva ejectors, and auxiliaries such as cuspidors, drinking fountains, etc.

The bracket 21 also provides a convenient means for providing support means for a basin. To this end, a basin bracket 64 is mounted on the bracket 21 near the flat end 23 thereof by being clamped around said bracket 21, and a curved upwardly extending arm 66 provided with a clamping member 67 which clamps around the downwardly extending effluent pipe 68 of the basin 69, said pipe 68 being connected to a flexible hose 71 the lower end of which is held on a floor mounted support 72 which leads through the floor to a conventional sewer outlet.

It will be seen, from the foregoing description, that we have provided a simple but highly effective and economical construction. The dental instrument center requires no more floor space than the dental chair itself. It moves upwardly and downwardly with the raising and lowering, respectively, of the dental chair, it does not interfere with the normal tilting of the dental chair, and it may be moved into a variety of positions about a vertical axis as indicated in FIG. 3. The instrument center has a range of movement so that it can be brought close to the patient as one wishes. The table has a permissible rotation of 360 degrees on its axis which allows one to rotate the instrument center so that drawers can be opened to the right or left by the operator or his assistant and still have instruments available. The instrument center can be brought to a position approximating the patient, or the drawers may be positioned 180 degrees from the patient and an assistant may use the drawers while the top of the instrument center is being used by the operator. The instrument center can be used when the patient is in a sitting up or reclining position in the chair and the operator is sitting or standing behind patient. The instrument center will be above the patient's chest in the reclining position, which gives the operator greater access to the instrument center. The instrument center can be swung to the side of the chair to allow for ease in seating the patient or if the patient is getting up from the chair.

It will be seen, from the foregoing description, that the distance from the seat to the bottom of the instrument center is always constant and, likewise, the distance from the seat to the top of the instrument center is always constant, so that the operator, or any other person, may have the instrument center at a constant level in relationship to himself and the patient, to make for much more ease of treatment. On prior art units in which the tables are stationary, upon raising the patient the patient's knees commonly get caught against the table. The vertical distance for the operator can be changed at his will, up or down, which allows him to work from the instrument center while sitting or standing, which, at best, in various prior art units, is very awkward. In this connection, it may be noted that various prior art instrument centers are built at the same distance from the floor for all operators, whether they are tall or short.

The instrument center of the present invention, over and above the foregoing advantages, saves floor space for the operator, which means that chairs can be closer together and save square feet of office space, and, in addition, it saves the operator from walking longer distances between chairs. Furthermore, by having the instrument center mounted to the chair, it allows better access for cleaning the floor area.

We claim:

1. In a dental instrument center, in combination with a dental chair which includes elevator means for up and down movement and which includes a seat and a seat supporting frame supported by the elevator means for up and down movement therewith, a bracket having, at one end thereof, a first horizontal generally planar portion, a horizontal generally planar extension which extends a short distance from and in substantially the same plane as said first generally planar portion, an angular portion extending downwardly from the horizontal generally planar extension and merging into a second substantially horizontal generally planar portion comprising two arms which are in angular relation to each other and which are in a horizontal plane below that of said first horizontal planar portion, the outer end of said second horizontal planar portion forming a supporting surface, said bracket being supported at said one end by the elevator means in position beneath the seat and mounted to ride upwardly and downwardly together therewith with said first horizontal planar portion, said horizontal planar extension and said angular portion of the bracket beneath the seat and with said second horizontal planar portion extending outwardly beyond the seat, and means supported by said supporting surface for supporting a tray or holder.

2. An instrument center according to claim 1, in which the supporting surface is a generally flat surface.

3. An instrument center according to claim 1, in which said means for supporting a tray or holder includes an upwardly extending hollow arm, said hollow arm being mounted freely for movement in a horizontal plane about a vertical axis.

References Cited

UNITED STATES PATENTS

| 533,445 | 2/1895 | Denison | 32—22 |
|---|---|---|---|
| 1,391,222 | 9/1921 | Van Fleet | 297—170 |
| 3,311,411 | 3/1967 | Page et al. | 32—22X |

FOREIGN PATENTS

| 630,156 | 12/1961 | Italy | 32—22 |
|---|---|---|---|

ROBERT PESHOCK, Primary Examiner